United States Patent [19]

Currie

[11] 4,304,219
[45] Dec. 8, 1981

[54] SOLAR ENERGY CONTROL SYSTEM

[75] Inventor: James R. Currie, Huntsville, Ala.

[73] Assignee: The United States of America as represented by the Administrator of the National Aeronautics and Space Administration, Washington, D.C.

[21] Appl. No.: 98,570

[22] Filed: Nov. 29, 1979

[51] Int. Cl.³ .................................................. F24J 3/02
[52] U.S. Cl. .................................... 126/422; 126/429; 126/430
[58] Field of Search ............... 126/430, 419, 422, 429; 62/156; 250/203 R; 165/22

[56] References Cited

U.S. PATENT DOCUMENTS

| | | | |
|---|---|---|---|
| 3,997,108 | 12/1976 | Mason | 126/430 |
| 4,051,999 | 10/1977 | Granger | 126/422 |
| 4,137,898 | 2/1979 | Koiznmi | 126/430 |
| 4,203,424 | 5/1980 | Coxon | 126/422 |
| 4,209,994 | 7/1980 | Mueller | 62/156 |
| 4,215,408 | 7/1980 | Games | 165/22 |

Primary Examiner—Samuel Scott
Assistant Examiner—G. Anderson
Attorney, Agent, or Firm—L. D. Wofford, Jr.; John R. Manning

[57] ABSTRACT

A solar energy control system for a hot air type solar energy heating system wherein thermocouples are arranged to sense the temperature of a solar collector, a space to be heated, and a top and bottom of a heat storage unit. Pertinent thermocouples are differentially connected together, and these are employed to effect the operation of dampers, a fan, and an auxiliary heat source. In accomplishing this, the differential outputs from the thermocouples are amplified by a single amplifier by multiplexing techniques. Additionally, the amplifier is corrected as to offset by including as one multiplex channel a common reference signal.

6 Claims, 5 Drawing Figures

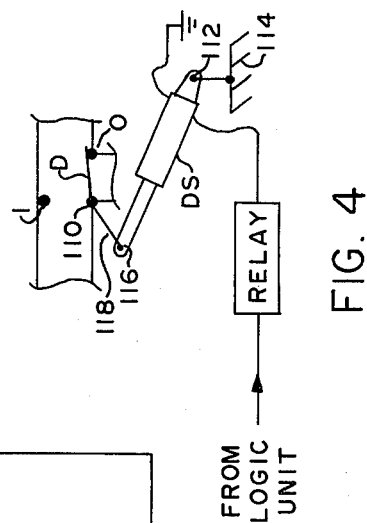
FIG. 4
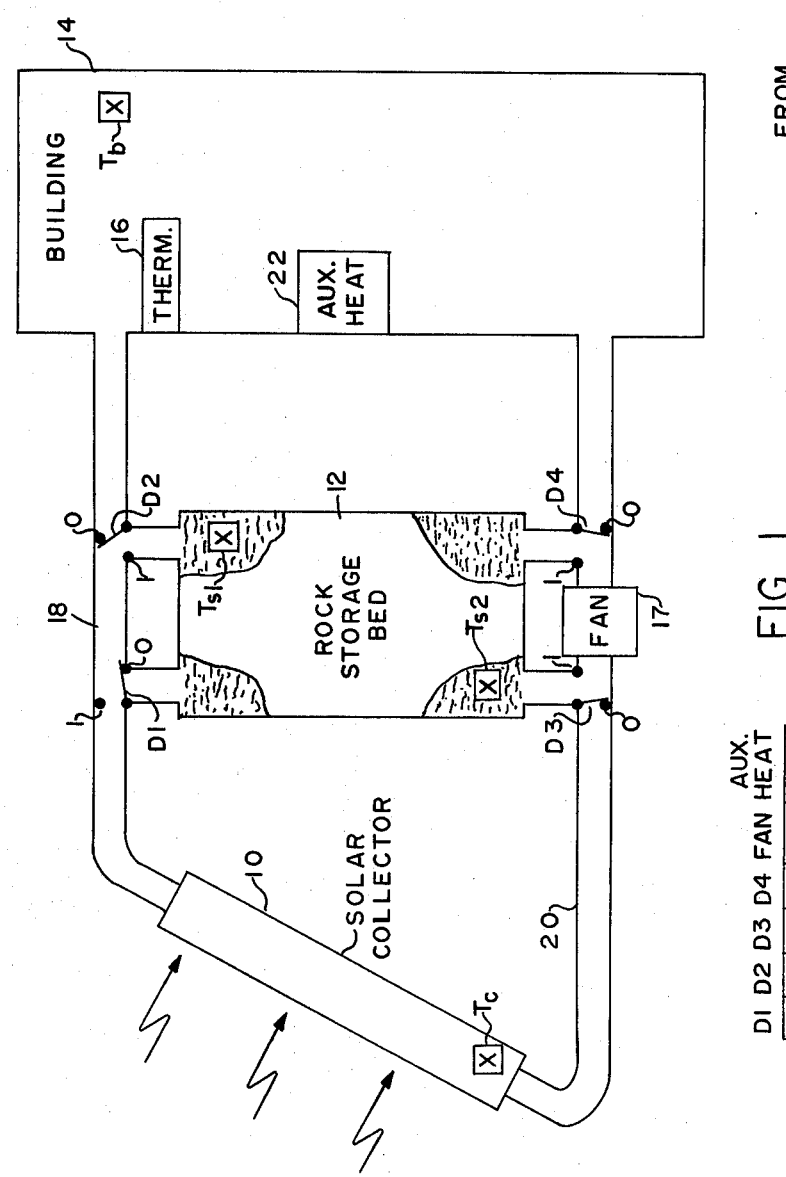
FIG. 1
FIG. 5

SOLAR ENERGY CONTROL SYSTEM

DESCRIPTION

ORIGIN OF THE INVENTION

The invention described herein was made by an employee of the United States Government and may be manufactured and used by or for the Government of the United States for governmental purposes without the payment of any royalties thereon or therefor.

TECHNICAL FIELD

This invention relates to solar energy heating systems, and particularly to systems wherein alternately heat is applied directly from a solar collector to a space to be heated, is applied from the collector to a heat storage unit, or heat is taken from the heat storage unit to a space to be heated.

BACKGROUND ART

The operation of certain solar energy heating systems requires that discrete temperature measurements be made of a solar collector, a heat storage unit, and a space to be heated in order to determine the routing of heat. Most such systems employ copper-constantan thermocouples, one being used to measure a discrete one of the system parameters. The low level output of a thermocouple must be amplified, and, in prior systems, the output of individual thermocouples was individually amplified, and this has required that the amplifier have a low input offset drift and that a fixed offset be removed with either a potentiometer or a resistor before the system is placed in operation. Each amplified temperature measurement is then referenced to a thermal standard which is either an oven or a diode voltage generator. Solar equations must then be solved using two or more temperature measurements summed in a separate amplifier.

An alternate system uses thermistors, each being connected in a bridge to drive a discrete amplifier and the solar equations solved by using two or more outputs from the separate amplifiers, which are then summed in another amplifier. Such a system requires an extremely accurate reference voltage plus an extremely accurate thermistor to make each measurement.

The two systems discussed have several disadvantages. First, both systems deal with absolute temperatures when actually the difference temperatures are ultimately needed. Further, a difference temperature is accurately obtained only when the absolute temperature of each measurement is accurately made. This is not easily accomplished since accuracy is degraded by amplifier offsets and gain error as well as sensor errors. To get around these problems, high quality and thus expensive components must be used.

STATEMENT OF THE INVENTION

In accordance with this invention, direct measurement is made of the difference between the discrete temperatures involved, as needed, and the resulting differential output signals are the only signals amplified. Second, amplification is effected by multiplexed operation of a single amplifier channel by which a sampled offset and gain correction signal is held and applied during the amplification of the temperature differential signals. Then, the outputs are applied to a logic circuit which, depending upon measured values, controls the operation of dampers and a fan to route heat alternately between a solar collector and a space to be heated, the collector and a heat storage unit, or between a heat storage unit and a space to be heated.

BRIEF DESCRIPTION OF THE DRAWINGS

FIG. 1 is an electrical schematic diagram of an embodiment of the invention.

FIG. 4 is a schematic illustration of the structure of one of the damper operated assemblies employed in the system shown in FIG. 2.

FIG. 5 is a logic truth table descriptive of the logic unit shown in FIG. 3.

DETAILED DESCRIPTION OF THE INVENTION

Figure 2:
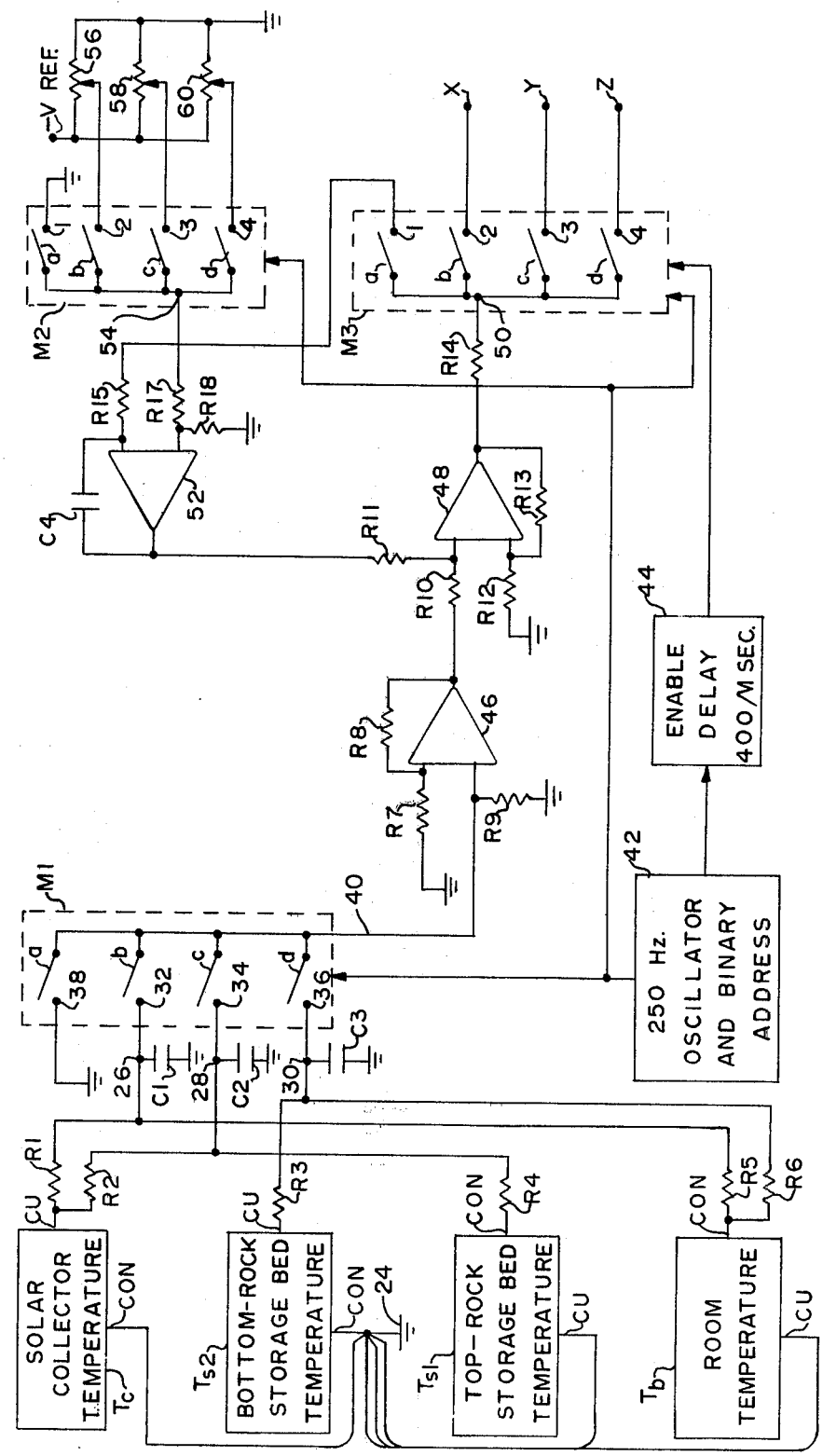
FIG. 2 is a schematic illustration of a solar heating system illustrating an example of the placement of the thermocouples schematically shown in FIG. 1.

Reference is first made to FIG. 1 which is illustrative of the solar heating system of this invention and illustrating the placement of thermocouples electrically connected in the circuit shown in FIG. 2. In the system of FIG. 1, air flow is controlled between and through solar collector 10, a heat storage unit, such as rock storage unit 12, and a building 14 to be heated. Solar heat is received by solar collector 10 and is supplied, alternately, to rock storage unit 12 or to building 14, depending upon whether or not thermostat 16 and building 14 indicate a demand for heat for the building. Specifically, in accordance with the overall system described herein, four possible modes of operation are contemplated. In accordance with the first mode, if the temperature of building 14, as indicated by sensor $T_b$ is below the temperature in solar collector 10, as indicated by sensor $T_c$, by a selected value chosen to be sufficiently higher to effect an efficient transfer of heat between collector 10 and building 14, the present system causes fan 17 to be turned on and dampers D1, D2, D3, and D4 to be positioned to allow flow in the loop formed by pipes 18 and 20 between collector 10 and building 14 and to prevent flow through rock storage unit 12. On the other hand, if the differential temperature between collector 10 and building 14 is insufficient in this regard, such a control arrangement will not be commanded.

In accordance with a second mode of operation, it will be assumed that the heat requirements in building 14 are satisfied and that thermostat 16 no longer requires heat, but the collector temperature exceeds the temperature of rock storage unit 12 by a selected value as measured by thermocouples $T_b$ and $T_s1$. During these conditions, the dampers shown would be closed off to the building, and hot air from collector 10 would be circulated through rock storage unit 12.

In accordance with the third mode of operation, if the temperature of collector 10 does not exceed that of building 14 by a selected amount, as indicated by thermocouples $T_c$ and $T_b$, and yet the temperature of rock storage unit 12 as indicated by thermocouple $T_s2$ exceeds the value of temperature in building 14, as indicated by thermocouple $T_b$, and thermostat 16 indicates a demand for heat, the dampers are set to enable fan 17 to force air through rock storage unit 12 to building 14. In modes 1, 2, and 3, auxiliary heater 22 is turned off.

As a fourth mode of operation, it is assumed that both the temperatures of collector 10 and rock storage 12 do not exceed the temperature of building 14 by a selected value, and yet thermostat 16 indicates a demand for heat, fan 17 is held off; and dampers D2 and D4 close off circulation to building 14, and auxiliary room heater 22 is turned on.

Referring now to FIG. 2, thermocouples $T_c$, $T_s1$, $T_s2$, and $T_b$ have one lead connected to a common ground point 24. The interconnection of leads, copper or constantan, of the thermocouples are poled to enable the desired subtraction of thermocouple outputs as required to determine the temperature differences necessary for control of the system as described. The output voltage of a thermocouple is positive at its copper terminal with respect to its constantan terminal. Thus, as shown, for example, the difference between solar collector temperature and room temperature is measured by summing the copper lead output of thermocouple $T_c$ with the constantan lead output of thermocouple $T_b$ through resistors R1 and R5 to a summing junction 26.

The difference between collector temperature and the temperature at the top region of rock storage unit 12 is determined by summing the copper lead of thermocouple $T_c$ with the constantan lead of thermocouple $T_s$ and then summing their outputs through resistors R2 and R4 at summing junction 28.

The difference between the temperature at the bottom of rock storage unit 12 and room temperature is sensed by summing the copper lead of thermocouple $T_s2$ with the constantan lead of thermocouple $T_b$ through resistors R3 and R6 to summing junction 30.

From the foregoing, it follows that there would be provided at summing junction 26 a positive output when the temperature sensed by thermocouple $T_c$ exceeds that of thermocouple $T_b$; when the temperature of thermocouple $T_c$ exceeds the temperature of thermocouple $T_s1$, there will be a positive voltage at summing junction 28. The outputs appearing at the summing junctions are filtered by low pass filtering effected by capacitors C1, C2, and C3, respectively, and applied to input terminals 32, 34, and 36, respectively, of multiplexer M1. A fourth input terminal, terminal 38, of multiplexer M1 is connected to ground. The input terminals are connected to electronic switches A, B, C, and D, respectively, as shown. A common output lead 40 connects through the switches to the input terminals, and thus the signals on the input terminals are fed to lead 40 as switches a, b, c, and d are sequentially and momentarily closed.

Multiplexer M1 is controlled by a 250 Hz oscillator and conventional binary address encoder 42 for effecting the sequential operation of switches of multiplexer M1 in a conventional manner and to commonly effect the same sequence of switching in like multiplexers M2 and M3. There is one difference with respect to multiplexer M3, and that is that an enable-delay circuit 44 provides a 400 microsecond delay (about 20% of an "on" period) in the operation of each switch of multiplexer M3, delay circuit 44 being connected between the output of oscillator 42 and multiplexer M3.

The signal on terminal 40, the output of multiplexer M1, is applied to the positive input of operational amplifier 46 across input resistor R9. Amplifier 46 is controlled in gain by negative feedback resistor R8 and input resistor R7, connected to the minus input of amplifier 46, gain typically set at 400. The output of amplifier 46 is fed through resistor R10 to the positive input of operational amplifier 48, and the gain of this amplifier is typically set at 400 by negative feedback resistor R13 and input resistor R12 connected to the negative input of amplifier 48. The output of amplifier 48 is fed through resistor R14 to a common input terminal 50 of the four switches a, b, c, and d of multiplexer M3. The output or switched terminal 1 of switch a of multiplexer M3 is fed through resistor R15 to the negative input terminal of signal correction amplifier 52. Correction amplifier 52 has two functions. One, it detects the signal condition of the output of amplifier 48 during the interval when the signal input to amplifier 46, through multiplexer M1, is a zero signal, as when switch a of multiplexer M1 is closed. While there should appear a zero level at the output of amplifier 48, typically there will be some error or offset signal present at the minus input of amplifier 52, introduced by amplifiers 46 and 48. Amplifier 52 amplifies this error signal and reverses its phase and applies it as a corrective signal through summing resistor R11 to the plus input of operational amplifier 48. This corrective signal is held by capacitor C4 for a finite time, and thus a correction is maintained after multiplexer M1 is shifted from the closure of each switch A and for at least a period sufficient to cycle through all of the multiplexer channels. The thus sustained corrective signal effects a nulling or error subtraction at the input of operational amplifier 48 where this signal is summed out of phase with the signal from amplifier 46.

A second function of operational amplifier 52 is to sequentially provide discrete reference temperature difference signals (as modified by a correction signal) to the plus input of operational amplifier 48 which are, in essence, selectively subtracted from the output sequentially being fed through amplifier 46 to amplifier 48 from summing junctions 26, 28, and 30. These reference signals enable in a discrete case a positive output signal at the output of amplifier 48 and on a particular output terminal (2, 3, or 4 of multiplexer M3) when a measured temperature difference exceeds a selected reference temperature difference. Since selected reference temperature differences may differ in each of the three measurements made by this circuit, separate signals are generated. Thus, as shown, reference signals are fed to the plus input of amplifier 52 through common output terminal 54 of multiplexer M2, which terminal is fed, sequentially, through switches A–D of this multiplexer, in turn switching in unison with like identified switches of multiplexers M1 and M2. Input 1 of the switches of multiplexer M2 is connected to ground to thus provide a zero reference, through resistor 17 and across resistor 18 to amplifier 52 when the error voltage for amplifiers 46, 48, and 52 is being sampled. Inputs 2, 3, and 4 to the other three switches of multiplexer M2 are each, respectively, connected to a discrete potentiometer of potentiometers 56, 58, and 60, whereby voltage inputs to these switches of the multiplexer may be separately adjusted to establish separate temperature difference references as described.

Figure 3:
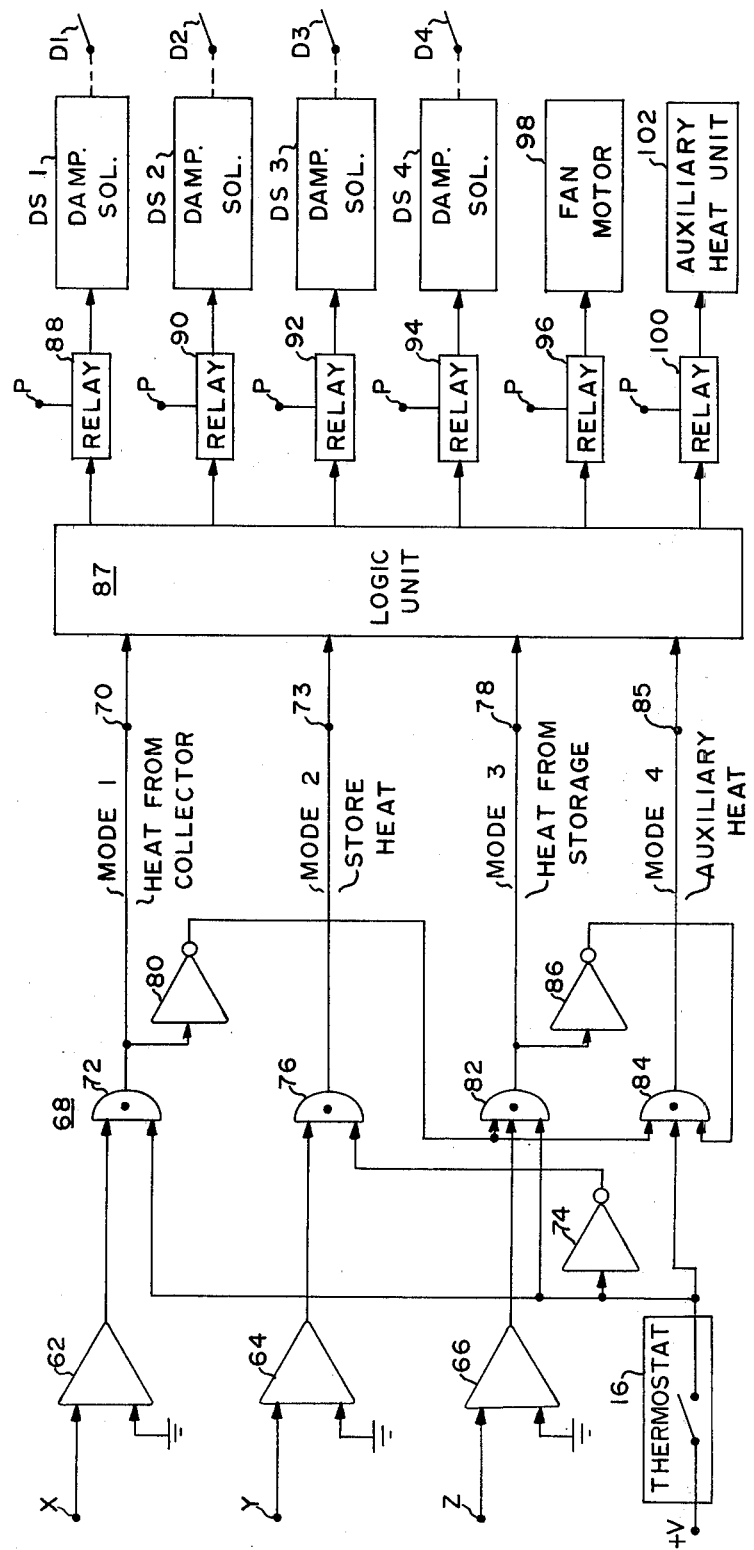
FIG. 3 is an electrical schematic diagram of the employment of the signal outputs of the amplification system shown in FIG. 1 to the solar heating system shown in FIG. 2.

In accordance with the foregoing arrangement of circuitry, outputs at terminals 2, 3, and 4 of multiplexer M3 sequentially appear at output terminals X, Y, and Z of FIG. 1 and at like input terminals to the logic circuitry of FIG. 3. As shown in FIG. 3, the three signals on these terminals are amplified to a logic level by amplifiers 62, 64, and 66, respectively. Thus, when the measured collector temperature-building temperature difference signal is positive and is greater than the reference temperature signal on potentiometer signal 56, there is provided a significant or binary 1 output at the output of amplifier 62. Similarly, when the measured collector temperature-rock storage temperature difference signal is positive and exceeds the reference signal of potentiometer 58, there is provided a binary 1 output at the output of amplifier 64. When the measured rock storage-room temperature differential signal is positive and exceeds the temperature reference from potentiometer 60, a binary 1 appears at the output of amplifier 66. The logic outputs of amplifiers 62, 64 and 66 are fed to logic circuitry 68.

In examining logic circuitry 68 in conjunction with the truth table of FIG. 5 for logic unit 86, it will be readily noted that mode 1 is selected, terminal 70 becomes true when thermostat 16 provides a command or binary 1 output to AND gate 72 and the output from amplifier 62 to AND gate 72 is true. This indicates that the room temperature of building 14 is below collector temperature by at least a selected amount as determined by the output of potentiometer 56. This signals that heat should be furnished by solar collector 10 to building 14.

Mode 2 is selected, terminal 72 goes true when thermostat 16 indicates no demand for heat and provides a zero output, which output is inverted by inverter 74 and is applied to AND gate 76, and the output of amplifier 64 applied to AND gate 76 is true. This thus indicates there is no requirement for room heat but the temperature of the collector is greater than the temperature of the upper region of storage unit 12 by at least a selected amount.

Mode 3 is selected, terminal 78 goes true only when mode 1 is not true. The selection of mode 3 is accomplished by feeding the mode 1 signal through inverter 80 to AND gate 82; feeding the rock storage-minus-room temperature signal-minus-reference signal from logic amplifier 66 to AND gate 82; and feeding an output from thermostat 16 to an input of AND gate 82. When all the inputs to AND gate 82 are true, this indicates that heat is being demanded, that heat is not available from solar collector 10, but is available from storage unit 12.

Mode 4 is selected by feeding the mode 1 signal through inverter 80 to AND gate 84; by feeding the mode 3 signal through inverter 86 to AND gate 84; and by supplying the output of thermostat 16 to an input of AND gate 84. In this fashion, there is a mode 4 output, terminal 85, when there is a demand for heat, and yet such is not available from either solar collector 10 or rock storage unit 12. The mode 1-4 output signals are applied to logic unit 87 which is conventionally configured in accordance with the truth table of FIG. 5. It provides control output through relays 88, 90, 92, and 94 to damper solenoids DS1, DS2, DS3, and DS4 associated with correspondingly designated dampers D1-D4 to cause them to assume a "0" or "1" position as illustrated in FIG. 1 corresponding to a "0" (no signal) output or significant (logical "1") signal output. The solenoids are powered through power terminals P as switched by the relays. Logic unit 87 would include appropriate amplification means for the amplification of each output to operate the damper relays. Similarly, logic unit 87 would provide amplified output signals, depending upon the logical "0" or "1" situation to operate, through fan relay 96, fan motor 98, or, through heat relay 100, auxiliary heat unit 102. Fan motor 98 and auxiliary heat unit 102 are powered through the relays by an appropriate power source applied as shown through terminal P.

In operation, assuming a mode 1 situation, it will be noted that damper D1 would be in its "0" position, and dampers D2, D3, and D4 would be in their "1" position, enabling air flow directly between solar collector 10 and building 14. This mode also calls for fan 17 to be on, which then forces circulation of air between solar collector 10 and room 14. Auxiliary heat unit 22 is at this time turned off.

In a mode 2 situation, it will be noted that dampers D1, D2, and D4 are in their "0" position and damper D3 in its "1" position. With fan 17 on, as indicated, heat will be drawn from collector 10 through rock storage unit 12.

In a mode 3 situation, dampers D1, D2, and D4 are in a "1" position and damper D3 in a "0" position. Fan 17 is indicated as on, and thus heated air from rock storage unit 12 is supplied to building 14.

In a mode 4 situation, all the dampers are in their "0" position and fan 17 is turned off. Accordingly, no air is drawn from rock storage unit 12 or from solar collector 10. However, as indicated, auxiliary heat unit 22 is switched to an "on" state, and thus it alone provides heat for building 14.

Referring to FIG. 4, there is illustrated schematically how a damper D pivoted at point 110 is moved to either a "1" position as shown or a "0" position by the action of a damper solenoid DS, which in turn is pivotally connected at a point 112 to a fixed member 114 and pivotally connected at a point 116 to an arm 118 connected to damper D.

In accordance with the foregoing, a complete and essentially trouble-free temperature controlled solar heating system is provided. Further, by means of the circuitry described, long-term accuracy of operation is assured and component costs are low.

I claim:

1. A solar energy control system including a solar collector unit, a space unit to be heated, a heat storage unit, and means for selectively enabling heat flow between said solar collector unit and said heat storage unit, said solar collector unit and space unit to be heated, and said heat storage unit and space unit to be heated, said solar collector unit having a heat medium inlet and outlet, said heat storage unit having upper and lower regions, said upper region having first and second heat medium couplers with said lower region having third and fourth heat medium couplers, and said space unit to be heated having a heat medium inlet and outlet, comprising:

at least one temperature-to-signal transducer coupled to each of said units;

difference means coupled to said transducers for providing selected difference signals from the outputs of each of said transducers;

an amplification means having a single amplification channel;

a first multiplex means for sequentially applying said difference signal to said amplification means;

a reference temperature means for supplying sequentially signals representing a preselected temperature difference;

a signal modification means coupled to said reference temperature means for modifying the output signal of said amplification means;

other multiplex means coupled to the output of said amplification means for supplying sequential signals;

a logic control coupled to the output of said other multiplex means and having a command signal output; and means responsive to said command signal for controlling said means for selectively enabling heat flow between said units; and said solar energy control system being further defined by:

a first temperature-to-signal transducer thermally coupled to said solar collector unit;

a second temperature-to-signal transducer thermally coupled to said lower region of said storage unit;

a third temperature-to-signal transducer thermally coupled to the upper region of said storage unit;

a fourth temperature-to-signal transducer thermally coupled to said space unit;

a first conduit interconnecting between the outlet of said space unit and inlet of said solar collector, and a second conduit interconnecting between said outlet of said solar collector and inlet of said space unit;

said first and second couplers of said upper region of said heat storage unit being coupled to said first conduit at spaced points along said first conduit, with said first coupler being downstream in flow with respect to said second coupler;

said third and fourth couplers of said lower region of said heat storage unit being coupled to said second conduit, with said third coupler being upstream in flow from said fourth coupler;

a first damper D1 positioned in said first conduit adjacent to said first coupler, said damper D1 being positionable between a "1" position, with flow through said conduit to said solar collector blocked and flow enabled through said first coupler, and in a "0" position, with flow through said conduit to said collector unit enabled and flow through said first coupler blocked;

a second damper D2 positioned adjacent to said second coupler and positionable between a "1" position, with flow through said second coupler blocked and flow from said space unit enabled, and a "0" position, with flow through said second coupler enabled and flow to said inlet of said solar collector enabled;

a third damper D3 positioned adjacent to said third coupler and positionable between a "0" position, with flow through said third coupler enabled and flow from said outlet of said collector blocked, and in a "1" position, with flow through said third opening blocked and flow from said outlet of said solar collector enabled;

a fourth damper D4 positioned adjacent to said fourth coupler and positionable between a "0" position, with flow through said fourth coupler enabled and flow in said second conduit to said space unit blocked, and in a "1" position, with flow through said fourth coupler blocked and flow through said second conduit to said space unit enabled;

a fan in said conduit between said third and fourth couplers and responsive to a "1" signal for operating said fan to an "on" state for causing air flow in said second conduit in a direction between said third and fourth couplers, said fan being in an "off" state in response to a "0" signal;

first temperature differential means for providing a first signal representative of the difference between the outputs of said first and fourth temperature-to-signal transducers, and first signal means including a first signal means for providing a "1" output when the output of said first transducer exceeds the output of said fourth transducer and a "0" output when it does not;

second temperature differential means for providing a second signal representative of the difference between the outputs of said first and third temperature-of-signal transducers, and second signal means including a second signal means for providing a "1" output when the output of said first transducer exceeds the output of said third transducer and a "0" output when it does not;

temperature selection means for providing a "1" signal output when the temperature in said space unit is less than a selected value and a "0" output when the temperature in said space unit is greater than a selected value; and logic means responsive to said first, second, and third signals of said differential means and the output of said temperature selection means for operating said dampers to a "0" to "1" position and said fan to an "on" or "1" state as set forth in the following truth table:

|        | D1 | D2 | D3 | D4 | fan |
|--------|----|----|----|----|-----|
| mode 1 | 0  | 1  | 1  | 1  | on  |
| mode 2 | 0  | 0  | 1  | 0  | on  |
| mode 3 | 1  | 1  | 0  | 1  | on  | wherein:

mode 1 is selected when said first signal is a "1" signal, and said output of said temperature selection means is a "1" signal, mode 2 is selected when the output of said temperature selection means is "0", and said second signal of said second differential means is a "1", and mode 3 is selected when said third signal of said third differential means is "1", said first signal of said differential means is "0", and the output of said temperature selection means is "1".

2. A solar energy control system as set forth in claim 1 further comprising auxiliary heat means for heating said space unit, and said logic means further includes means for operating said auxiliary heat means "on" in accordance with the following truth table:

|        | D1 | D2 | D3 | D4 | fan | aux. heat |
|--------|----|----|----|----|-----|-----------|
| mode 1 | 0  | 1  | 1  | 1  | on  | off       |
| mode 2 | 0  | 0  | 1  | 0  | on  | off       |
| mode 3 | 1  | 1  | 0  | 1  | on  | off       |
| mode 4 | 0  | 0  | 0  | 0  | off | on        | wherein mode 4 is selected when modes 1 and 3 are not selected and temperature selection means provides a "1" signal.

3. A solar energy control system as set forth in claim 1 having:

first, second, and third multiplexers having at least first, second, third, and fourth sequentially operated, coordinately switched, channels, each channel having an input and output, the outputs of the channels of said first multiplexer being connected together, the outputs of the channels of said second multiplexer being connected together, and the inputs of the channels of said third multiplexer being connected together;

a reference and common input being connected to one input of said first channel of said first and second multiplexers;

said first signal being provided as an input to the second channel input of said first multiplexer, said second signal being provided as an input to the third channel of said first multiplexer, and said third signal being provided as an input to the fourth channel of said first multiplexer;

amplification means comprising at least one amplifier stage and responsive to the sequential outputs of said channels of said first multiplexer for providing an output to inputs of said channels of said third multiplexer;

a reference temperature signal for providing a discrete reference temperature input separately to each of said second, third, and fourth channels of said second multiplexer; and signal modification means comprising:

a differential amplifier having its negative input coupled to the output of said first channel of said third multiplexer, its positive input connected to the output of the channels of said second multiplexer, and its output connected to the input of a stage of amplification of said amplification means, and a capacitor being coupled between the negative input and output of said differential amplifier, and the polarity of signal coupling of said differential amplifier being such that a negative feedback is effected from the output to input of said amplifier means;

whereby amplifier offset is corrected, and each temperature measurement signal applied to an input of said channels of said first multiplexer is compared with a reference temperature signal, and a significant output is provided from one of the outputs of said third multiplexer when a temperature measurement signal exceeds a signal from said reference temperature signal means appearing in the same channel.

4. A solar energy control system as set forth in claim 3 including signal delay means for delaying the switching operation of said third multiplexer with respect to the switching operations of said first and second multiplexers, whereby the output of said amplification means is connected before coupling the output of the amplification means through said third multiplexer.

5. A solar energy control system as set forth in claim 3 wherein said delay is equal to at least approximately 20% of the "on" time of a switched channel of a said multiplexer.

6. A solar energy control system as set forth in claim 3 wherein each said temperature signal means comprises a pair of differentially connected thermocouples.

* * * * *